United States Patent
Izumi (10) Patent No.: US 7,598,634 B2
(45) Date of Patent: Oct. 6, 2009

(54) FAN MOTOR

(75) Inventor: Kazuyuki Izumi, Iwata (JP)

(73) Assignee: ASMO Co., Ltd., Shizuoka-pref. (JP)

(*) Notice: Subject to any disclaimer, the term of this patent is extended or adjusted under 35 U.S.C. 154(b) by 0 days.

(21) Appl. No.: 11/907,632

(22) Filed: Oct. 16, 2007

(65) Prior Publication Data

US 2008/0122322 A1 May 29, 2008

(30) Foreign Application Priority Data

Nov. 24, 2006 (JP) ............... 2006-317383

(51) Int. Cl.
  *H02K 9/06* (2006.01)
(52) U.S. Cl. .................................. 310/58; 310/61
(58) Field of Classification Search .................. 310/58, 310/61–63; 417/366, 368
  See application file for complete search history.

(56) References Cited

U.S. PATENT DOCUMENTS 7,015,606 B2 * 3/2006 Huang et al. ............. 310/63
7,042,121 B2 * 5/2006 De Filippis et al. ......... 310/63
2004/0223845 A1 11/2004 Caplan et al.

* cited by examiner

*Primary Examiner*—Dang D Le
(74) *Attorney, Agent, or Firm*—Posz Law Group, PLC (57) ABSTRACT

In a fan motor, a fan boss of a fan is integrally rotatably connected to a housing of a drive motor unit. A plurality of fins axially extends from an inner surface of a bottom portion of the fan boss toward a bottom portion of the housing of the drive motor unit and radially inwardly extends from an inner peripheral surface of a tubular portion of the fan boss to create a cooling air flow from an interior of the housing toward an outside of the housing through cooling holes of the housing upon rotation of the fan boss. Each of the plurality of fins includes an auxiliary fin at a location, which is axially opposed to a corresponding one of the at least one cooling hole, to facilitate creation of the cooling air flow upon the rotation of the fan boss.

6 Claims, 7 Drawing Sheets

FAN MOTOR

CROSS REFERENCE TO RELATED APPLICATION

This application is based on and incorporates herein by reference Japanese Patent Application No. 2006-317383 filed on Nov. 24, 2006.

BACKGROUND OF THE INVENTION

1. Field of the Invention

The present invention relates to a fan motor.

2. Description of Related Art

A fan motor is known and is disclosed in, for example, US 2004/0223845A1. In the fan motor of US 2004/0223845A1, a rotatable shaft is provided in a drive motor unit of an inner rotor type, and a fan is connected to the rotatable shaft. The fan has a cup-shaped fan boss. A plurality of blades is provided to an exterior of the fan boss, and a plurality of fins is provided in an interior of the fan boss. Furthermore, a plurality of cooling holes is provided in a bottom portion of a motor housing of the drive motor unit. When the drive motor unit is energized to rotate the rotatable shaft, the fan boss is rotated relative to the housing of the drive motor unit to rotate the blades and thereby to create an air flow for cooling a radiator of a vehicle. At this time, another cooling air flow is also created by the fins of the fan boss to flow from an interior of the housing of the drive motor unit to the outside of the housing of the drive motor unit through the cooling holes.

However, in the fan motor disclosed in US 2004/0223845A1, although the cooling air flow is created by the fins of the fan boss to flow from the interior of the housing of the drive motor unit to the outside of the housing of the drive motor unit, a flow quantity of the cooling air flow, which passes the interior of the housing of the drive motor unit, is relatively small. Thus, the interior of the drive motor unit cannot be effectively cooled.

SUMMARY OF THE INVENTION

The present invention addresses the above point. Thus, it is an objective of the present invention to provide a fan motor, which is capable of increasing a flow quantity of a cooling air flow that passes an interior of a drive motor unit to more effectively cool the interior of the drive motor unit.

To achieve the objective of the present invention, there is provided a fan motor, which includes a drive motor unit and a fan. The drive motor unit includes a housing, which has a tubular portion and a bottom portion. The bottom portion is provided at one axial end of the tubular portion and includes at least one cooling hole that axially penetrates through the bottom portion. The fan includes a fan boss, which is integrally rotatably connected to the housing and is driven by the drive motor unit. The fan boss has a tubular portion and a bottom portion. The bottom portion of the fan boss is provided at one axial end of the tubular portion of the fan boss and is axially opposed to the bottom portion of the housing. A plurality of blades is provided to an outer surface of the tubular portion of the fan boss. A plurality of fins axially extends from an inner surface of the bottom portion of the fan boss toward the bottom portion of the housing and radially inwardly extends from an inner peripheral surface of the tubular portion of the fan boss to create a cooling air flow from an interior of the housing toward an outside of the housing through the at least one cooling hole of the housing upon rotation of the fan boss. Each of the plurality of fins includes an auxiliary fin at a location, which is axially opposed to a corresponding one of the at least one cooling hole, to facilitate creation of the cooling air flow upon the rotation of the fan boss.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A structure of a fan motor 10 according to a first embodiment of the present invention will be described.

Figure 1:
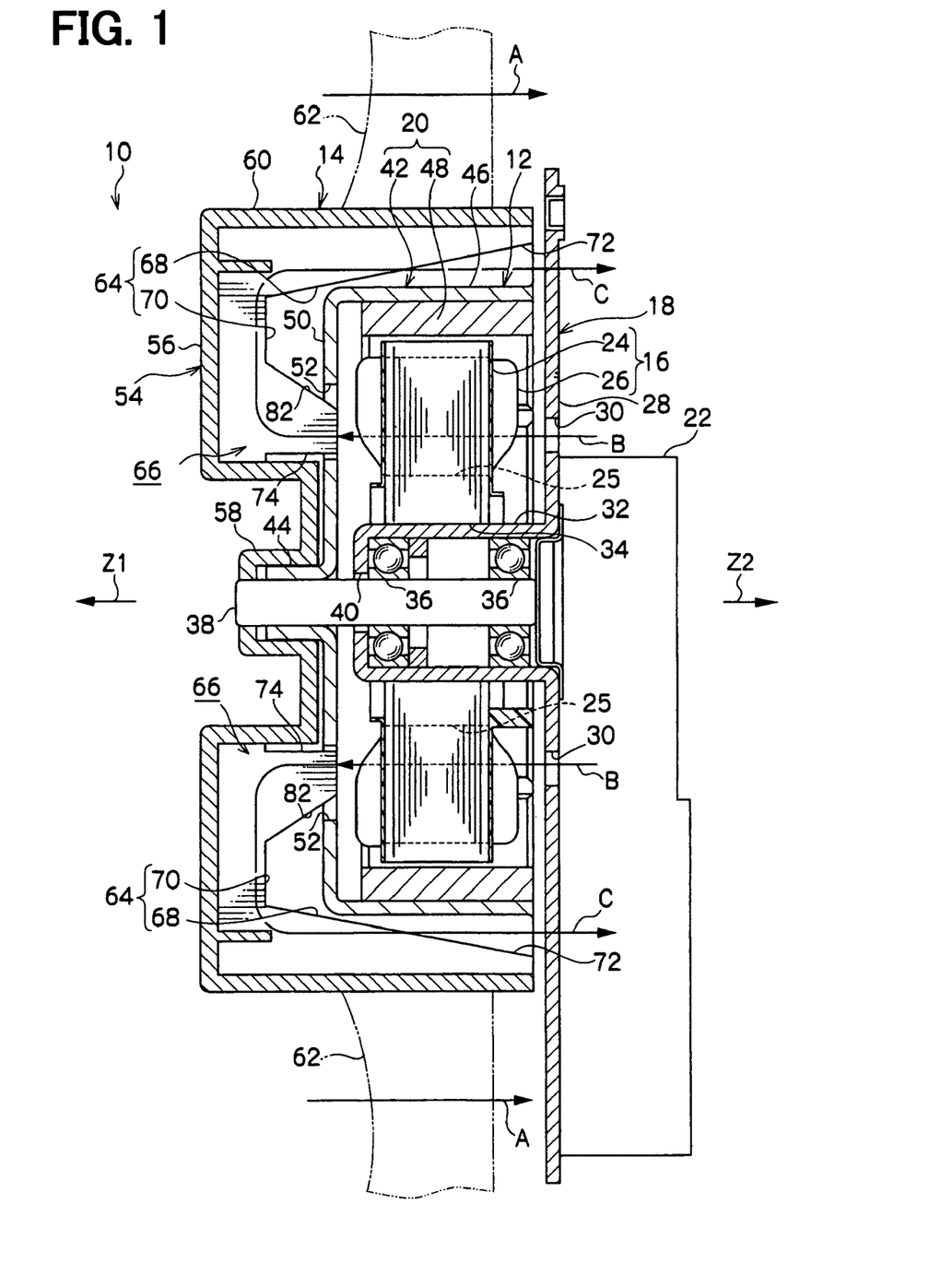
FIG. 1 is an axial cross sectional view of a fan motor according to a first embodiment of the present invention.
Figure 2:
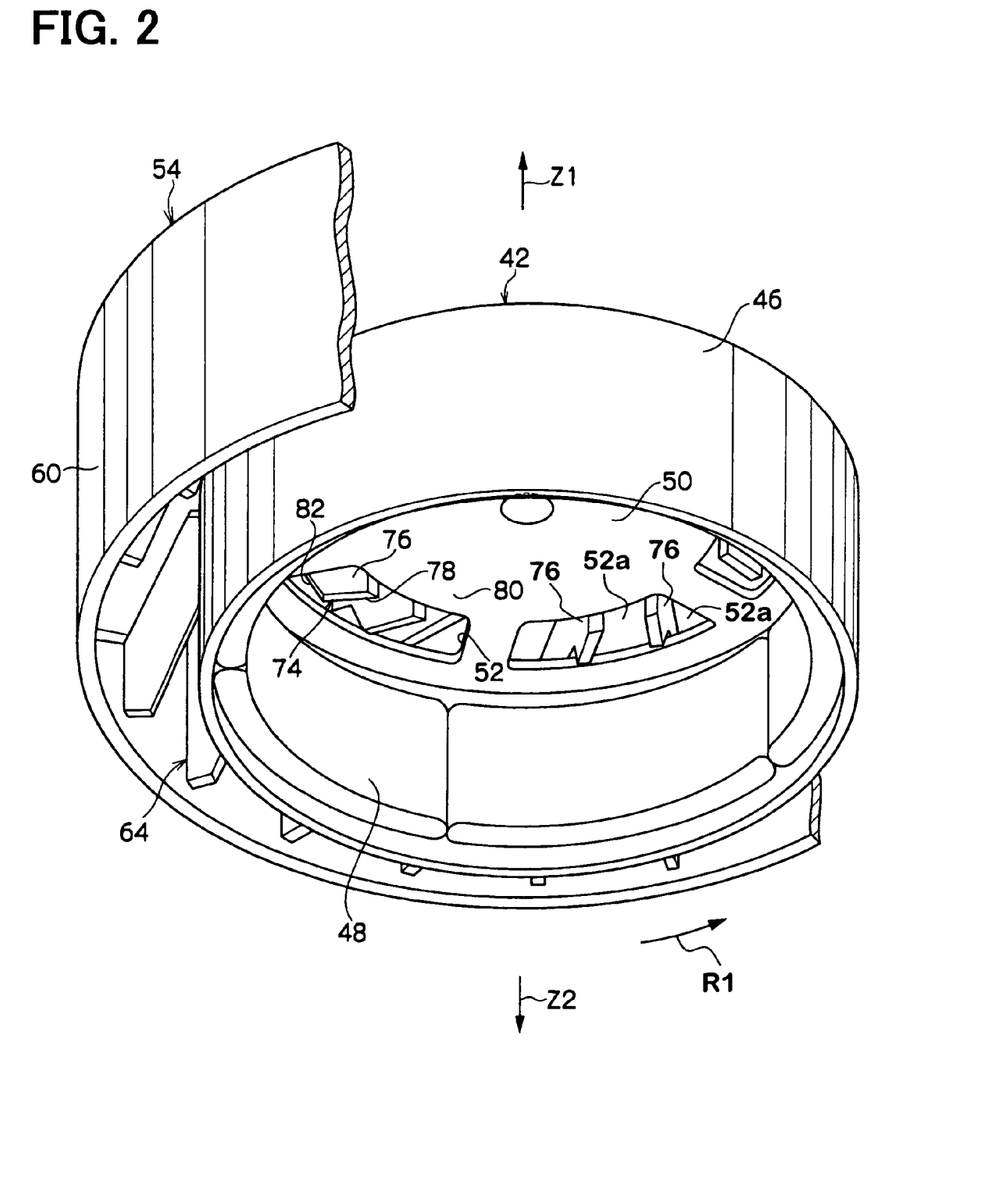
FIG. 2 is a partially fractured perspective view showing a fan boss and a rotor housing of the fan motor of the first embodiment seen from a back side.
Figure 3:
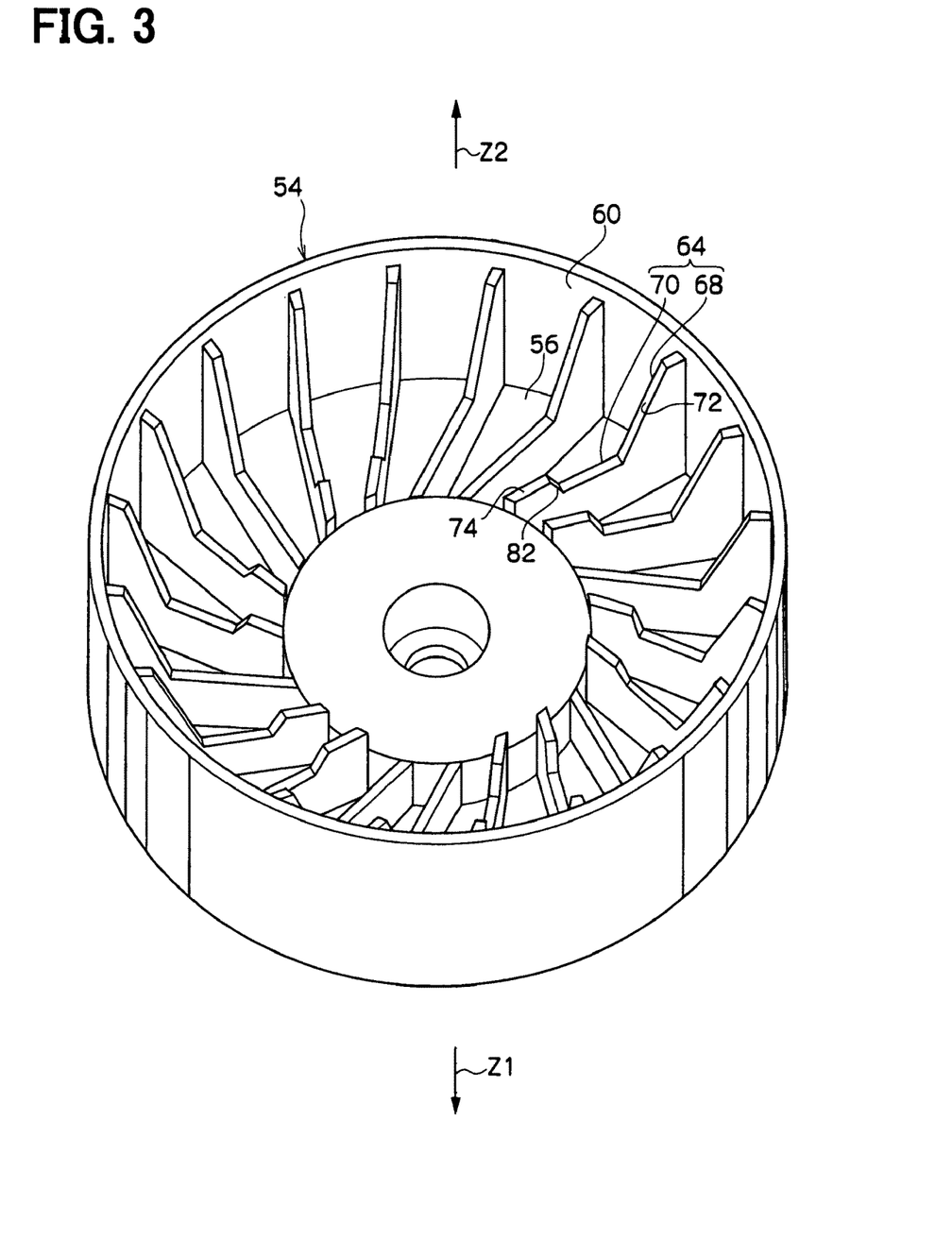
FIG. 3 is a perspective view showing the fan boss seen from a different angle, which is different from that of FIG. 2.
Figure 4:
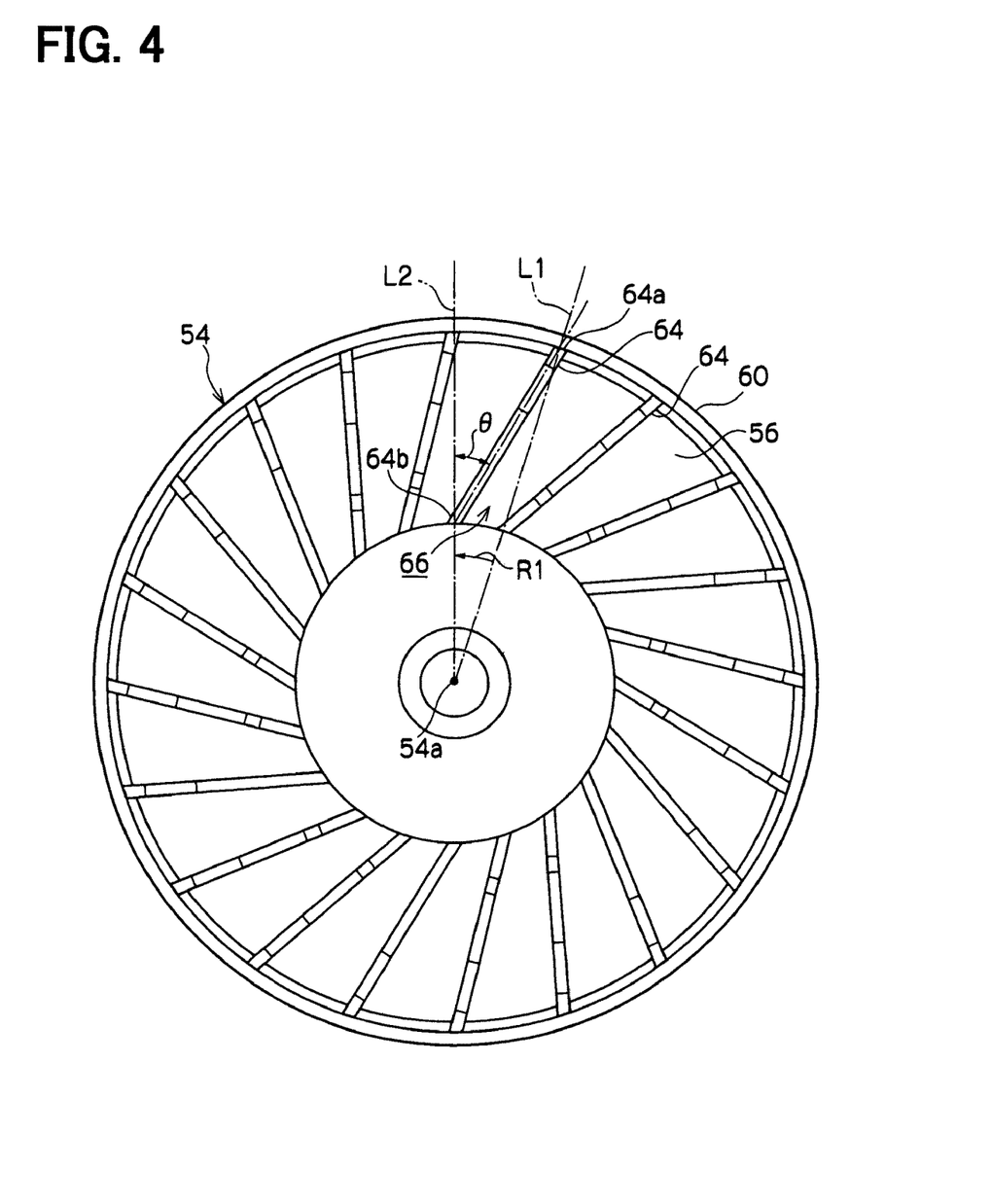
FIG. 4 is a bottom view of the fan boss according to the first embodiment of the present invention.
Figure 5:
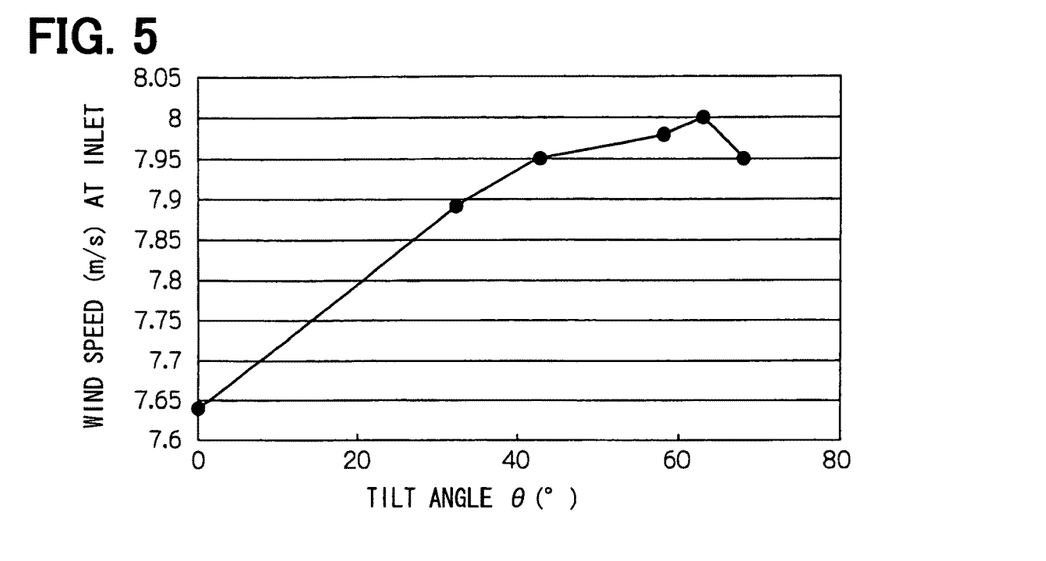
FIG. 5 is a diagram showing a relationship between a tilt angle of fins of the fan boss and a wind speed at an inlet of the fan boss according to the first embodiment of the present invention.

FIG. 1 is an axial cross sectional view of the fan motor 10 according to the first embodiment of the present invention. FIG. 2 is a partially fractured perspective view showing a fan boss 54 and a rotor housing 42 of the fan motor 10 seen from a back side. FIG. 3 is a perspective view showing the fan boss 54 seen from a different angle, which is different from that of FIG. 2. FIG. 4 is a bottom view of the fan boss 54. Furthermore, FIG. 5 is a diagram showing a relationship between a tilt angle of fins 64 of the fan boss 54 and a wind speed (air flow speed) at an inlet 66 of the fan boss 54.

The fan motor 10 of the first embodiment shown in FIG. 1 is for cooling a radiator of a vehicle and is placed adjacent to the radiator in an engine room of the vehicle. The fan motor 10 includes a drive motor unit 12 and a fan 14.

The drive motor unit 12 is formed as a brushless motor of an outer rotor type and includes a stator 16, a stator housing 18, a rotor 20 and a control circuit 22.

In the stator 16, windings 26 are wound over an annular laminated core 24 via an insulator. The stator housing 18 includes a disk-shaped housing main body 28. Cooling holes 30 extend through the housing main body 28 in a wall thickness direction at radially outward of a center part of the housing main body 28.

A tubular centerpiece 32 is provided at the center part of the housing main body 28. The centerpiece 32 is received in a through hole 34 of the laminated core 24. When the centerpiece 32 is press fitted into the through hole 34 of the laminated core 24, the stator 16 is installed integrally to the stator housing 18.

Two bearing members 36 are received in the centerpiece 32 to rotatably support a rotatable shaft 38. One longitudinal end of the rotatable shaft 38 protrudes outward from the centerpiece 32 through a hole 40 at a bottom portion of the center piece 32. A projecting end of the rotatable shaft 38 is fixed to a central support 44 of the rotor housing 42, which is provided in the rotor 20.

The rotor 20 includes the rotor housing 42 of a cup-shaped type. The rotor housing 42 receives the stator 16 therein. Rotor magnets 48 are fixed to an inner peripheral surface of a tubular portion 46 of the rotor housing 42. The rotor magnets 48 are radially opposed to the laminated core 24, which is provided to the stator 16. Cooling holes 52 extend through a bottom portion 50 of the rotor housing 42 in the wall thickness direction (axial direction) at radially outward of the center part of the rotor housing 42.

The control circuit 22 is provided integrally to the stator housing 18 and is electrically connected to the windings 26, which are provided in the stator 16. The control circuit 22 sequentially applies electric current to the windings 26 of the stator 16 based on a control signal, which is outputted from an external control device (not shown).

The fan 14 includes the cup-shaped fan boss 54, which is larger than the rotor housing 42 in both of the axial direction and the radial direction. The fan boss 54 has a bottom portion 56, which is axially opposed to the bottom portion 50 of the rotor housing 42. A tubular connection 58 is formed in the center of the bottom portion 56. When the tubular connection 58 is securely fitted to the central support 44 of the rotor housing 42, the fan boss 54 is connected to the rotor housing 42 in an integrally rotatable manner.

Furthermore, in the fan boss 54, a tubular portion 60 is formed integrally with the bottom portion 56. A plurality of blades 62 extends radially outward from an outer peripheral surface of the tubular portion 60. The blades 62 are constructed to create a cooling air flow, which flows from one axial side (Z1 side) to the other axial side (Z2 side) of the fan motor 10 upon rotation of the fan 14, as indicated by an arrow A in FIG. 1. In FIGS. 2 to 4 of the first embodiment, the blades 62 are not depicted for the sake of simplicity.

Furthermore, as shown in FIG. 4, a plurality of fins 64, each of which extends radially from a radially inner side to a radially outer side (more specifically, radially inwardly extends from an inner peripheral surface of the tubular portion 60 of the fan boss 54), is provided in the interior of the fan boss 54. With reference to FIG. 4, for descriptive purpose, it is now assumed that an imaginary line L1 connects between a radially outer end portion 64a of one of the fins 64 and a rotational center 54a of the fan boss 54. A radially inner end portion 64b of this fin 64 is located on a forward side (front side) of the imaginary line L1 in a rotational direction of the fan boss 54 (a direction of an arrow R1). Therefore, this fin 64 is tilted by a tilt angle θ relative to an imaginary line L2, which connects between the radially inner end portion 64b of this fin 64 and the center 54a of the fan boss 54.

FIG. 5 shows the relationship between this tilt angle θ and the wind speed (air flow speed) at the inlet 66 of the fins 64 (a radially inner part of a space between corresponding adjacent fins 64 near the corresponding cooling hole 52). In the present embodiment, based on the result of FIG. 5, the tilt angle θ of each fin 64 is set to be θ=60 degrees to achieve the relatively high wind speed.

Furthermore, as shown in FIGS. 1 and 3, each fin 64 extends continuously from the bottom portion 56 to the tubular portion 60 in the fan boss 54. Specifically, each fin 64 includes a first fin portion 68 and a second fin portion 70. The first fin portion 68 is formed at the tubular portion 60 of the fan boss 54 and projects from the tubular portion 60 of the fan boss 54 toward the tubular portion 46 of the rotor housing 42. The second fin portion 70 is formed at the bottom portion 56 of the fan boss 54 and projects from the bottom portion 56 of the fan boss 54 toward the bottom portion 50 of the rotor housing 42.

A tilt portion 72 is formed in a radially inner part of the first fin portion 68 to extend toward the bottom portion 56 of the fan boss 54 in the axial direction. Furthermore, an auxiliary fin 74 is provided to the second fin portion 70 at a location, which is axially opposed to the corresponding cooling hole 52 formed in the bottom portion 50 of the rotor housing 42 (i.e., a location where the cooling hole 52 is axially projected).

The auxiliary fin 74 is formed by setting a height of the corresponding part of the second fin portion 70, which is measured from the bottom portion 56 of the fan boss 54, to be higher than that of the rest of the second fin portion 70 (an adjacent part of the fin 64 that is adjacent to the auxiliary fin 74). Furthermore, as shown in FIG. 2, a projecting side portion 76 of the auxiliary fin 74 is placed inside of the corresponding cooling hole 52, which is formed in the bottom portion 50 of the rotor housing 42, to define an air guide passage 52a in the cooling hole 52 on a forward side of the projecting side portion 76 in the rotational direction R1 of the fan boss 54. In addition, an axial position of a projecting end surface 78 of the auxiliary fin 74 generally coincides with an axial position of an inner end surface 80 of the bottom portion 50 of the rotor housing 42.

Furthermore, as shown in FIGS. 1 and 3, a tilt portion 82 is formed by chamfering a corner of a radially outer end portion of the auxiliary fin 74. The tilt portion 82 is tilted such that a radial extent of the tilt portion 82 increases toward the bottom portion 56 of the fan boss 54 in the axial direction.

When the fan 14 is rotated, the fins 64, each of which has the auxiliary fin 74, create the cooling air flow, which flows from the interior of the rotor housing 42 to the outside of the rotor housing 42 through the cooling holes 52 and is thereafter discharged from the one axial side (Z1 side) to the other axial side (Z2 side) of the fan motor 10, as indicated by an arrow C, through the space between the inner peripheral side of the fan boss 54 and the outer peripheral side of the rotor housing 42.

Furthermore, the auxiliary fins 74 of the fins 64 promote the creation of the cooling air flow indicated by the arrow C (i.e., increase the air flow) upon rotation of the fan 14.

Next, operation of the fan motor 10 according to the first embodiment of the present invention will be described.

In the fan motor 10, when a rotational magnetic field is applied from the stator 16 to the rotor magnets 48, the rotor 20 is rotated, and thereby the fan 14 is rotated together with the rotor 20. When the fan 14 is rotated, the cooling air flow is created from the one axial side (Z1 side) to the other axial side (Z2 side) of the fan motor 10, as indicated by the arrow A.

When the cooling air flow is created as indicated by the arrow A, a positive pressure is developed on the other axial side (Z2 side) of the fan motor 10, and a negative pressure is developed on the one axial side (Z1 side) of the fan motor 10. Thus, as indicated by an arrow B, the cooling air flows from the other axial side (Z2 side) of the fan motor 10 into the interior of the rotor housing 42 through the cooling holes 30 and is discharged from the rotor housing 42 through the cooling holes 52 after passing through the interior of the rotor housing 42 (particularly, slots 25 of the laminated core 24). In this way, the stator 16, which is received in the interior of the rotor housing 42, can be cooled.

Furthermore, at this time, the fins 64, which extend radially in the interior of the fan boss 54, create the cooling air flow, which flows from the interior of the rotor housing 42 to the outside of the rotor housing 42 through the cooling holes 52 and is discharged from the one axial side (Z1 side) to the other axial side (Z2 side) of the fan motor 10 through the space between the inner peripheral side of the fan boss 54 and the outer peripheral side of the rotor housing 42. In this way, due to the development of the negative pressure around the cooling holes 52, the flow quantity of the cooling air, which passes the interior of the rotor housing 42, is increased, and thereby the stator 16, which is received in the interior of the rotor housing 42 can be more effectively cooled.

Here, each fin 64, which creates the cooling air flow indicated by the arrow C, has the auxiliary fin 74 at the location that is axially opposed to the corresponding cooling hole 52 to promote the creation of the cooling air flow indicated by the arrow C. Thus, due to the presence of the auxiliary fin 74, it is possible to increase the flow quantity of the cooling air flow, which is discharged from the interior of the rotor housing 42 to the outside of the rotor housing 42 through the cooling holes 52. Therefore, the flow quantity of the cooling air, which passes through the interior of the rotor housing 42, is increased to more effectively cool the stator 16 that is received in the interior of the rotor housing 42.

In this way, the fan motor 10 according to the first embodiment of the present invention can increase the flow quantity of the cooling air flow, which passes the interior of the drive motor unit 12, to more effectively cool the interior of the drive motor unit 12.

Furthermore, in the fan motor 10 according to the first embodiment of the present invention, each fin 64 is constructed such that the radially inner end portion 64b of the fin 64 is located on the forward side of the imaginary line L1, which connects between the radially outer end portion 64a of the fin 64 and the center 54a of the fan boss 54, in the rotational direction of the fan boss 54 (direction of the arrow R1). Therefore, the wind speed at the inlet 66 of the respective fins 64 can be increased. As a result, the flow quantity of the cooling air flow, which is indicated by the arrow C, can be increased further.

Furthermore, in the fan motor 10 of the first embodiment, the tilt portion 82 is provided in the radially outer end portion of the auxiliary fin 74 in such a manner that the radial extent of the tilt portion 82 increases toward the bottom portion 56 of the fan boss 54 in the axial direction. In this way, the flow quantity of the cooling air flow, which is indicated by the arrow C, can be easily and reliably increased.

Furthermore, in the fan motor 10 of the first embodiment of the present invention, the auxiliary fin 74 is formed simply by setting the height of the corresponding part of the second fin portion 70 of the fin 64, which is measured from the bottom portion 56 of the fan boss 54, to be higher than that of the rest of the second fin portion 70.

Second Embodiment

Next, a structure of a fan motor 100 according to a second embodiment of the present invention will be described.

Figure 6:
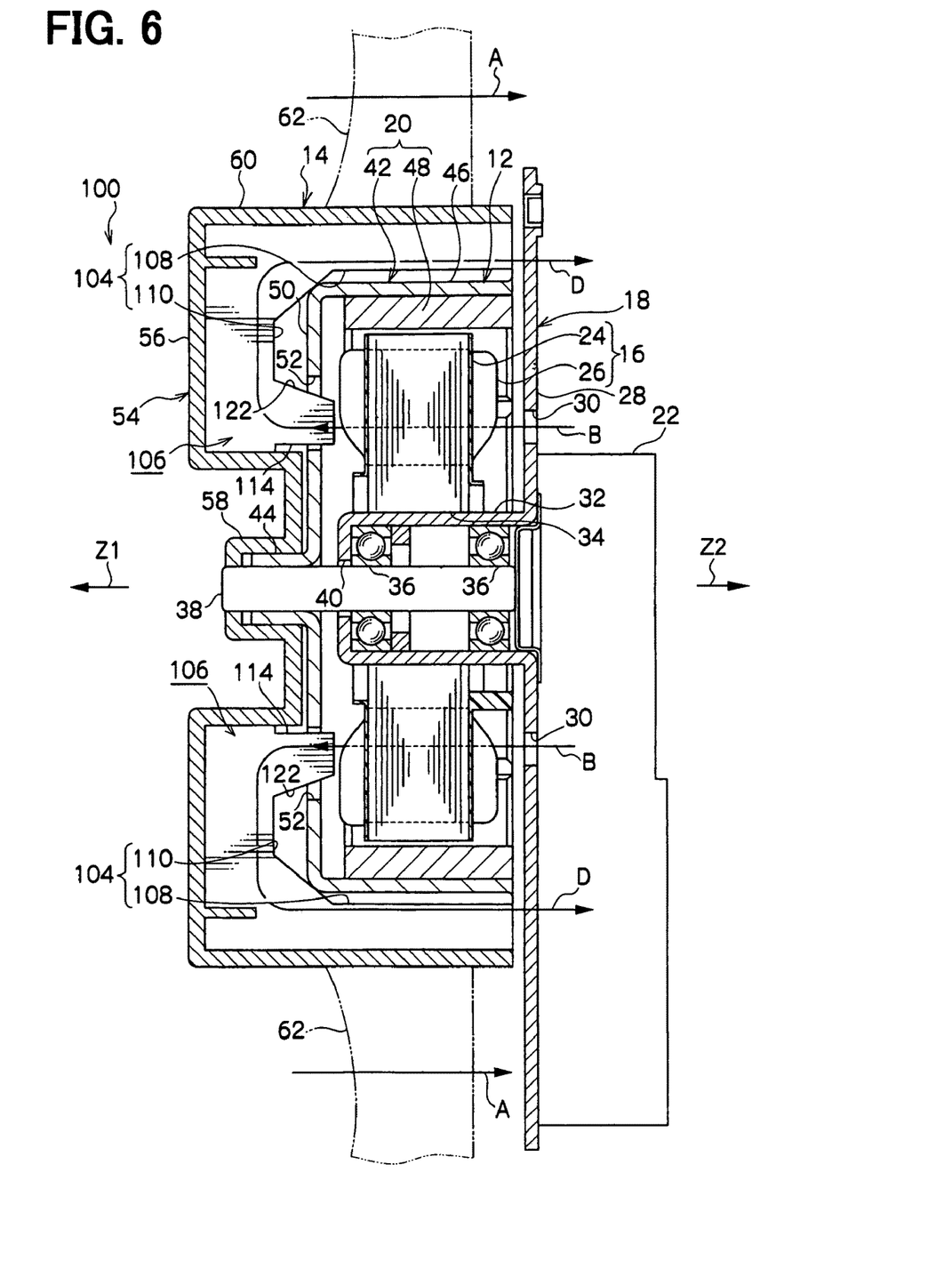
FIG. 6 is an axial cross sectional view of a fan motor according to a second embodiment of the present invention.
Figure 7:
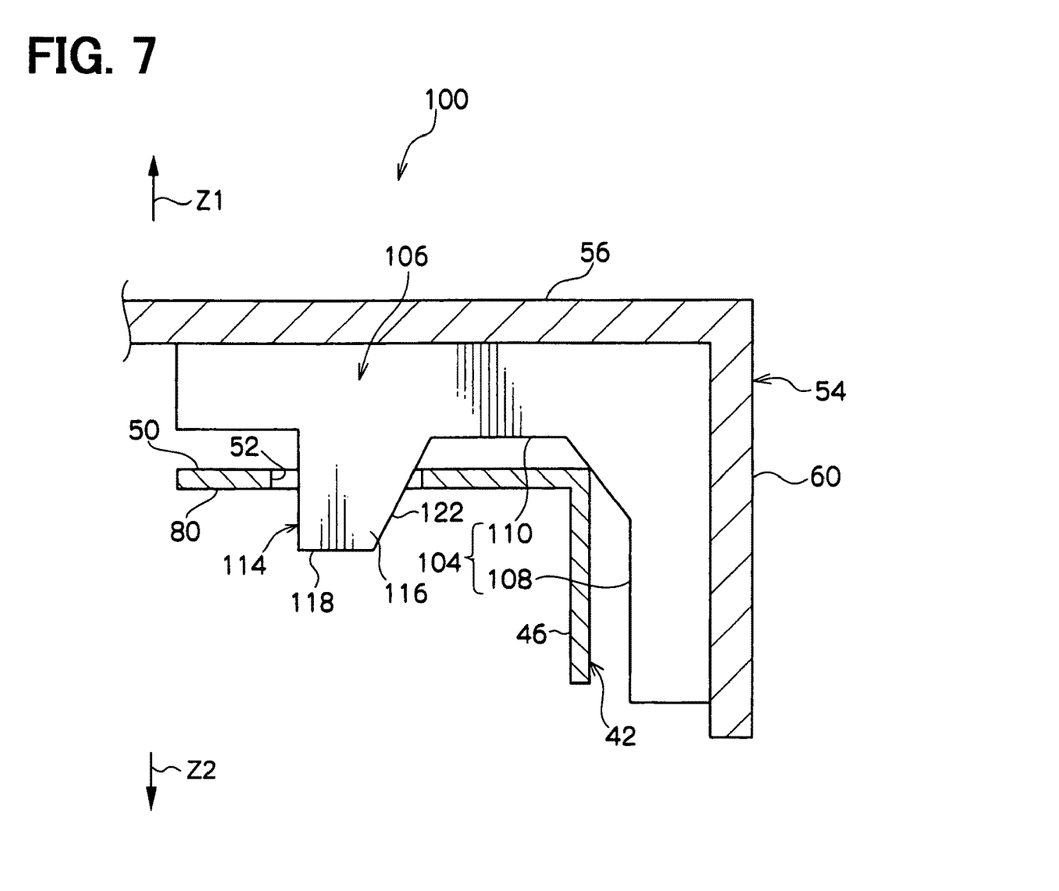
FIG. 7 is an enlarged partial cross sectional view of the fan motor according to the second embodiment of the present invention.

FIG. 6 is an axial cross sectional view of the fan motor 100 according to the second embodiment of the present invention. FIG. 7 is an enlarged partial cross sectional view of the fan motor 100.

In the fan motor 100 according to the second embodiment of the present invention, a shape of each fin 104 and a shape of each auxiliary fin 114 are changed from those of the fan motor 10 of the first embodiment. In the second embodiment, the structural characteristics of the fan motor 100 other than those described below are the same as those of the first embodiment of the present invention. Thus, the same structural characteristics, which are the same as those described above in the first embodiment, will be indicated by the same reference numerals and will not be described further for the sake of simplicity.

As shown in FIGS. 6 and 7, in the fan motor 100 of the second embodiment of the present invention, each fin 104 is formed continuously from the bottom portion 56 of the fan boss 54 to the tubular portion 60. That is, each fin 104 includes a first fin portion 108 and a second fin portion 110. The first fin portion 108 is formed at the tubular portion 60 of the fan boss 54 and projects from the tubular portion 60 of the fan boss 54 toward the tubular portion 46 of the rotor housing 42. The second fin portion 110 is formed at the bottom portion 56 of the fan boss 54 and projects from the bottom portion 56 of the fan boss 54 toward the bottom portion 50 of the rotor housing 42.

The first fin portion 108 is formed to extend in parallel with the axial direction. The second fin portion 110 includes the auxiliary fin 114. The auxiliary fin 114 is formed by setting a height of the corresponding part of the second fin portion 110, which is measured from the bottom portion 56 of the fan boss 54, to be higher than that of the rest of the second fin portion 110. Furthermore, as shown in FIG. 7, a projecting side portion 116 of the auxiliary fin 114 is placed in the interior space of the rotor housing 42 through the corresponding cooling hole 52, which is formed in the bottom portion 50 of the rotor housing 42.

That is, the projecting end surface 118 of the auxiliary fin 114 is placed axially inward (Z2 side) of the inner end surface 80 of the bottom portion 50 of the rotor housing 42. Furthermore, a tilt portion 122 is formed by chamfering a corner of a radially outer end portion of the auxiliary fin 114. A radial extent of the tilt portion 112 increases toward the bottom portion 56 of the fan boss 54 in the axial direction.

When the fan 14 is rotated, the fins 104, each of which has the auxiliary fin 114, create the cooling air flow, which flows from the interior of the rotor housing 42 to the outside of the rotor housing 42 through the cooling holes 52 and is thereafter discharged from the one axial side (Z1 side) to the other axial side (Z2 side) of the fan motor 100, as indicated by an arrow D, through the space between the inner peripheral side of the fan boss 54 and the outer peripheral side of the rotor housing 42.

Furthermore, the auxiliary fins 114 of the fins 104 promote the creation of the cooling air flow indicated by the arrow D (i.e., increase the air flow) upon rotation of the fan 14.

Next, an operation of the fan motor 100 according to the second embodiment of the present invention will be described.

In the fan motor 100, when a rotational magnetic field is applied from the stator 16 to the rotor magnets 48, the rotor 20 is rotated, and thereby the fan 14 is rotated together with the rotor 20. When the fan 14 is rotated, the cooling air flow is created from the one axial side (Z1 side) to the other axial side (Z2 side) of the fan motor 100, as indicated by the arrow A.

When the cooling air flow is created as indicated by the arrow A, a positive pressure is developed on the other axial side (Z2 side) of the fan motor 100, and a negative pressure is developed on the one axial side (Z1 side) of the fan motor 100. Thus, as indicated by an arrow B, the cooling air flows from the other axial side (Z2 side) of the fan motor 100 into the interior of the rotor housing 42 through the cooling holes 30 and is discharged from the rotor housing 42 through the cooling holes 52 after passing through the interior of the rotor housing 42 (particularly, slots 25 of the laminated core 24). In this way, the stator 16, which is received in the interior of the rotor housing 42, can be cooled.

Furthermore, at this time, the fins 104, which extend radially in the interior of the fan boss 54, create the cooling air flow, which flows from the interior of the rotor housing 42 to the outside of the rotor housing 42 through the cooling holes 52 and is discharged from the one axial side (Z1 side) to the other axial side (Z2 side) of the fan motor 100 through the space between the inner peripheral side of the fan boss 54 and the outer peripheral side of the rotor housing 42. In this way, due to the development of the negative pressure around the cooling holes 52, the flow quantity of the cooling air, which passes the interior of the rotor housing 42, is increased, and thereby the stator 16, which is received in the interior of the rotor housing 42, can be more effectively cooled.

Here, each fin 104, which creates the cooling air flow indicated by the arrow D, has the auxiliary fin 114, which promotes the creation of the cooling air flow indicated by the arrow D. The projecting end of the auxiliary fin 114 is placed in the interior space of the rotor housing 42 through the corresponding cooling hole 52 that is formed in the bottom portion 50 of the rotor housing 42. Thus, due to the presence of the auxiliary fin 114, it is possible to increase the flow quantity of the cooling air flow, which is discharged from the interior of the rotor housing 42 to the outside of the rotor housing 42 through the cooling holes 52. Therefore, the flow quantity of the cooling air, which passes through the interior of the rotor housing 42, is increased to more effectively cool the stator 16 that is received in the interior of the rotor housing 42.

In this way, the fan motor 100 according to the second embodiment of the present invention can increase the flow quantity of the cooling air flow, which passes the interior of the drive motor unit 12, to more effectively cool the interior of the drive motor unit 12.

Furthermore, in the fan motor 100 of the second embodiment of the present invention, similar to the fins 64 of the first embodiment, each fin 104 is constructed such that a radially inner end portion of the fin 104 is located on a forward side of an imaginary line L1, which connects between a radially outer end portion of the fin 104 and the rotational center 54a of the fan boss 54, in the rotational direction of the fan boss 54 (see FIG. 4). Therefore, the wind speed at the inlet 106 of the respective fins 104 can be increased. As a result, the flow quantity of the cooling air flow, which is indicated by the arrow D, can be increased further.

Furthermore, in the fan motor 100 of the second embodiment, the tilt portion 122 is provided in the radially outer end portion of the auxiliary fin 114 in such a manner that the radial extent of the tilt portion 122 increases toward the bottom portion 56 of the fan boss 54 in the axial direction. In this way, the flow quantity of the cooling air flow, which is indicated by the arrow D, can be easily and reliably increased.

Furthermore, in the fan motor 100 of the second embodiment of the present invention, the auxiliary fin 114 is formed simply by setting the height of the corresponding part of the second fin portion 110 of the fin 104, which is measured from the bottom portion 56 of the fan boss 54, to be higher than that of the rest of the second fin portion 110.

Next, a result of analysis of the fan motors 10, 100 of the above embodiments will be described.

Figure 8A:
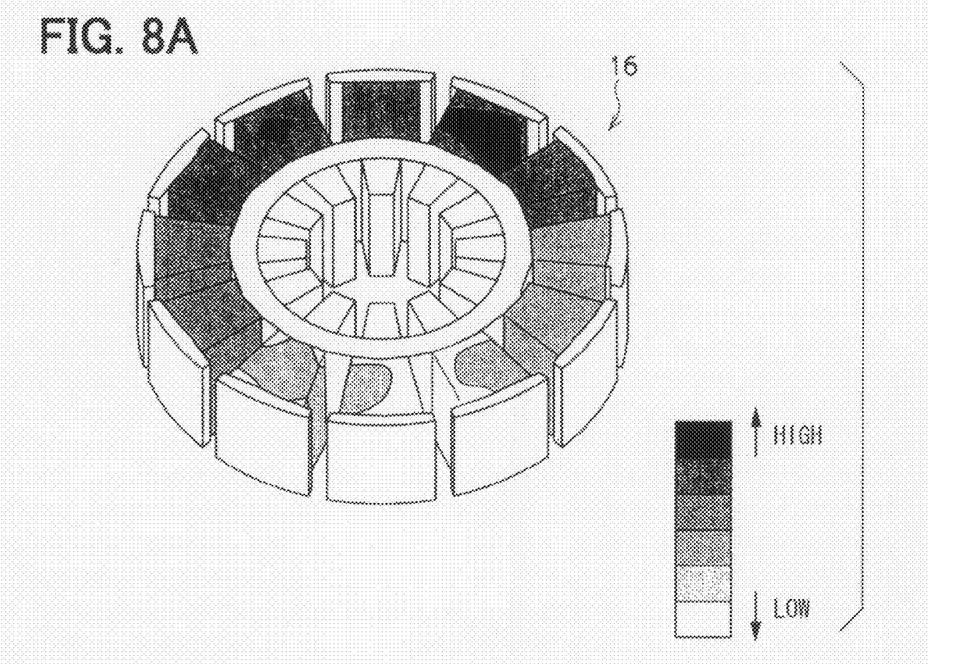
FIG. 8A is a diagram showing a result of analysis of a stator of the fan motor according to the first embodiment of the present invention.
Figure 8B:
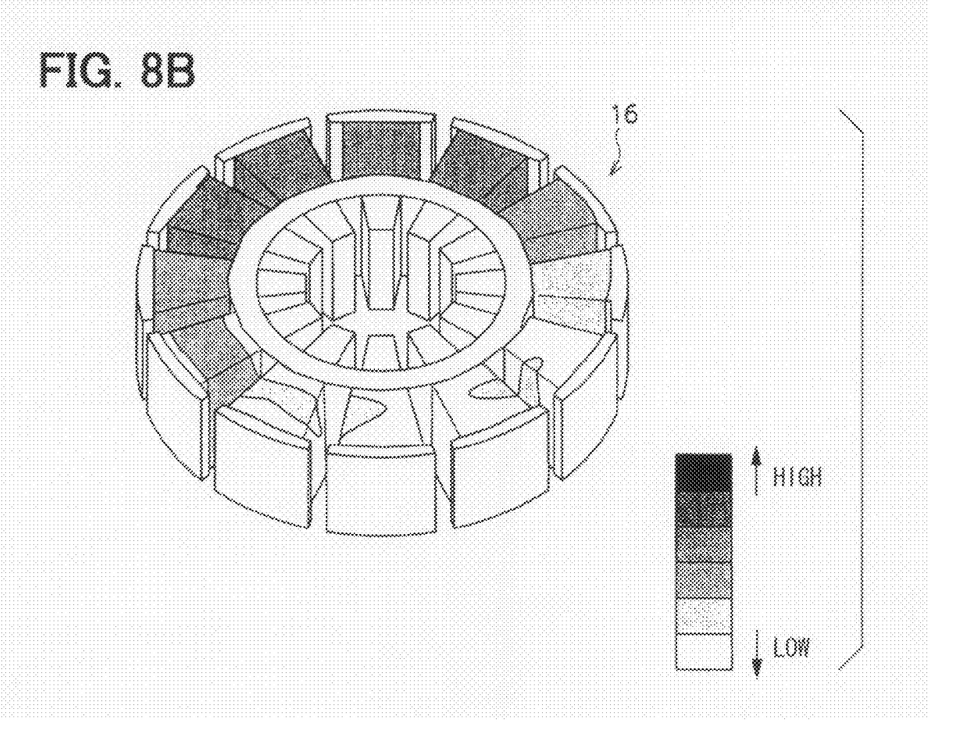
FIG. 8B is a diagram showing a result of analysis of a stator of the fan motor according to the second embodiment of the present invention.

FIGS. 8A and 8B show the result of the analysis of the fan motors 10, 100 of the above embodiments. The result of the analysis is obtained by continuously operating the fan motor 10, 100, and computing a temperature distribution of the stator 16 through a computer. This temperature distribution is depicted in the drawings. Specifically, FIG. 8A shows the result of the analysis of the stator 16 of the fan motor 10 according to the first embodiment of the present invention, and FIG. 8B is the result of the analysis of the stator 16 of the fan motor 100 according to the second embodiment of the present invention. In FIGS. 8A and 8B, the darker the shade is, the higher the distributed temperature is. As clearly shown in FIGS. 8A and 8B, the fan motor 100 according to the second embodiment of the present invention shows the higher cooling performance for cooling the stator 16 in comparison to the fan motor 10 according to the first embodiment of the present invention.

That is, as shown in FIGS. 6 and 7, when the projecting end of each auxiliary fin 114 is placed in the interior space of the rotor housing 42 through the corresponding cooling hole 52 formed in the bottom portion 50 of the rotor housing 42, the flow quantity of the cooling air flow, which is discharged from the interior of the rotor housing 42 out of the rotor housing 42 through the cooling holes 52, is advantageously increased in comparison to the structure of each auxiliary fin 74 shown in FIG. 1. Therefore, the stator 16, which is received in the rotor housing 42 can be more effectively cooled in the fan motor 110.

Additional advantages and modifications will readily occur to those skilled in the art. The invention in its broader terms is therefore not limited to the specific details, representative apparatus, and illustrative examples shown and described.

What is claimed is:

1. A fan motor comprising:
   a drive motor unit that includes a housing, which has a tubular portion and a bottom portion, wherein the bottom portion is provided at one axial end of the tubular portion and includes at least one cooling hole that axially penetrates through the bottom portion; and
   a fan that includes a fan boss, which is integrally rotatably connected to the housing and is driven by the drive motor unit, wherein:
   the fan boss has a tubular portion and a bottom portion;
   the bottom portion of the fan boss is provided at one axial end of the tubular portion of the fan boss and is axially opposed to the bottom portion of the housing while defining an axial space between the bottom portion of the fan boss and the bottom portion of the housing;
   a plurality of blades is provided to an outer surface of the tubular portion of the fan boss;
   a plurality of fins radially inwardly extends from an inner peripheral surface of the tubular portion of the fan boss and axially extends from an inner surface of the bottom portion of the fan boss at least into an interior of a corresponding one of the at least one cooling hole of the bottom portion of the housing through the axial space to form an auxiliary fin, which defines an air guide passage in the cooling hole on a forward side of the auxiliary fin in a rotational direction of the fan boss to create a cooling air flow from an interior of the housing toward an outside of the housing through the air guide passage upon rotation of the fan boss.

2. The fan motor according to claim 1, wherein the auxiliary fin of each of the plurality of fins axially extends into the interior of the housing through the corresponding one of the at least one cooling hole.

3. The fan motor according to claim 1, wherein the drive motor unit includes:

a stator that includes a laminated core, around which a plurality of windings is wound; and a rotor that is rotatable relative to the stator and includes the housing as a rotor housing of the rotor, which receives the stator.

4. The fan motor according to claim 1, wherein a radially inner end portion of each of the plurality of fins is located on a forward side of an imaginary line, which connects between a radially outer end portion of the fin and a rotational center of the fan boss, in the rotational direction of the fan boss.

5. The fan motor according to claim 1, wherein the auxiliary fin of each of the plurality of fins has a height, which is measured from the bottom portion of the fan boss and is higher than an adjacent part of the fin that is adjacent to the auxiliary fin.

6. The fan motor according to claim 5, wherein:

a tilt portion is formed to extend radially outwardly in a radially outer part of the auxiliary fin in each of the plurality of fins; and a radial extent of the tilt portion increases toward the bottom portion of the fan boss in an axial direction of the drive motor unit.

* * * * *